3,529,970
BAKERY FORMULATION

Eugene J. Turro, Addison, Ill., assignor to Central Soya Company, Inc., Chicago, Ill., a corporation of Indiana
No Drawing. Filed Feb. 8, 1967, Ser. No. 614,563
Int. Cl. A21d 2/36
U.S. Cl. 99—90                                    3 Claims

ABSTRACT OF THE DISCLOSURE

The addition to a bakery formulation of a mixture of 1 part soy protein concentrate with ½ to 2 parts soy flour having a Nitrogen Solubility Index of over 66% results in an improved yield of bread because of increased water absorption in the dough while maintaining the other physical and chemical characteristics of the dough and bread at least of equal character.

SUMMARY OF INVENTION

Historically, non-fat dry milk has been used to impart certain desirable characteristics to such bakery products as bread. The protein added through the vehicle of the milk solids results in a better yield of bread because of improved absorption of water. The total water content permissible in bread is regulated under Government standards but breads made with milk solids and various combinations of other ingredients therewith have seldom been able to reach this standard without affecting dough machinability and bread quality. The presence of the standardized amount of water is advantageous in developing both physical and chemical properties, improving shelf life, as well as making the bread more economical to produce.

The presence of optimum amount of water, made possible through the introduction of non-wheat protein, prevents the dough from drying up so that it does not stick to the baker's hands. Milk solids also have a favorable effect on crust color through participation in browning reactions, buffer the dough so as to prevent gas formation during proofing, improve the grain and texture of the bread, and are important in machinability—the dividing and molding of the dough (essentially the handleability). Still further, the protein additive is advantageous from the standpoint of improving the nutritional quality of the bread.

Because of the continually increasing cost of nonfat dry milk, bakers have, in the past, attempted to substitute various protein materials for the milk solids—in whole or in part. One commonly utilized expedient is to substitute a soy flour-whey solids combination for a portion of the nonfat dry milk. This, of course, lowers the cost but at the same time one has to reduce the water absorption also, otherwise the dough will be more difficult to machine. It also causes the grain and texture of the bread to deteriorate somewhat.

This invention is based, in part, upon the discovery that a particular soy protein, soy protein concentrate, in combination with a soy flour having a high water-soluble protein content is effective as a complete substitute for the non-fat dry milk and, further, gives a significant increase in water absorption when employed in the preparation of bread. Soy protein concentrate contains not less than 70% protein ($N \times 6.25$) on a moisture-free basis. It is "a product prepared from high-quality, sound, clean, dehulled soybeans by removing most of the oil and water-soluble, non-protein constituents therefrom." (As defined by the National Soybean Processors Association; also found in the Soybean Digest Bluebook of March 1966, line 26, No. 6, p. 20, as edited by American Soybean Association; and accepted by the Meat Inspection Division of USDA.)

The increase in water absorption was particularly unexpected since the soy protein concentrate fraction employed may or may not be high in water-soluble protein. In the past, only proteins with high water-soluble protein content were used to obtain desirable grain and crumb color. Furthermore, the absorption increase was found to be relatively higher than that which could be predicted on the basis of protein increase alone when substituting the soy fluor additive with a soy flour-soy protein concentrate composition in the bread formulation. Thus, I find a synergism between the soy flour and soy protein concentrate employed in whole or in part as a substitute for the non-fat dry milk used heretofore in the preparation of bread.

The soy protein concentrate employed is that derived from defatted soy flour or flakes by removing the sugars, mineral matter, etc. by leaching with a suitable solvent.[1] Resulting therefrom is a product which has a total protein content of about 67% and of which 5%–70% is water-soluble, depending upon the method of preparation. In contrast to this, the soy flour of this invention has a total protein content of the order of about 53% and of this amount 66% is water-soluble protein as determined by the AOCS "Nitrogen Solubility Index."[2]

Optimum results are obtained in the practice of the invention when the composition substituted for the non-fat dry milk has the two elements—the soy flour having a high water-soluble protein content and the soy protein concentrate—present in about equal proportions. By this, I refer to proportions in the range of 45%–55%.

An approach to optimum occurs when the two elements are present in the ratio of about 1:2 to 2:1, either one part flour to two parts protein concentrate or vice versa. The testing of various formulations indicated that if the level of soy flour is increased beyond the 2:1 ratio, the dough becomes slack and difficult to handle. This requires a reduction in water absorption from the optimum that is attainable by using a lower than 2:1 ratio. Also, there is a need for using more dusting flour to machine the dough, coupled with the need for opening of the bottom sheeting rolls, which in turn reduces the degassing process with the result of undesirable open grain and poorer textile. Using a ratio where the flour is less than one third of the total ingredient composition, results in a greyish texture and a loss of crust color, both undesirable characteristics for commercial white bread. The crumb color also changes from an off-white to a creamy yellow and the grain texture becomes more open and coarse when the water-soluble protein content of the soy flour goes below 66%.

The laboratory and commercial testing were made utilizing commercially-available products for the composition substituted for the non-fat dry milk. The flour employed had a water-soluble protein content of about 68%, and the soy protein concentrate employed was obtained from three different commercial sources, and had water-soluble protein contents of 65%, 6% and 2%,

---

[1] Suitable solvent:

(1) U.S. 2,881,076; Apr. 7, 1959. L. Sair (Griffith Labs). Proteinaceous Soy Composition and Method of Preparing.
(2) "Flash Desolventizing Defatted Soybean Meals Washed With Aqueous Alcohols To Yield a High-Protein Product." G. C. Mustakas, L. D. Kirk and E. L. Griffin, Jr. J. Am. Oil Chemists' Soc., 39, 222–26 (1962).
(3) U.S. 3,142,571; July 28, 1964. J. K. McAnelly (Swift & Co.). Method for Producing a Soybean Protein Product and the Resulting Product.
(4) "A Bland Protein From Soybeans." J. E. Long. Paper presented at the meeting of the AACC, St. Louis, Mo. (Abstract 67 of Program for 47th Annual Meeting), May 23, 1962.
(5) Method of Preparing Edible Soybean Characterized by Greatly Enhanced Water Absorption. U.S. 3,268,503, G. C. Mustakas and E. L. Griffin.

[2] American Oil Chemists' Society Tentative Method Ba 11–65 "Nitrogen Solubility Index (NSI)."

respectively. The three sources represent products by leaching with aqueous acid, aqueous alcohol and by water leaching of a previously heat treated soy flake or flour.

In general, the series of experiments and tests, both in the laboratory and commercial bakeries revealed that the composition of the invention provided superior absorption in the bread dough—in the order of about 2% more than when using non-fat dry milk, both at the 3% level of the additive, while maintaining the other physical and chemical characteristics of the dough and bread at least of equal character.

In rating the breads produced throughout the various tests, a bread using non-fat dry milk was employed as the control. The criteria of quality were separated into two categories for purpose of scoring the bread. The first category has to do with external characteristics and constituted 30% of the total score; these external characteristics included volume, crust color, symmetry, evenness of bake, character of crust, and the break and shred character. The other category evaluated was "internal" and constituted 70% of the total score; this included grain, color of crumb, aroma, taste, keeping quality, and texture. (Conversion Factors and Technical Data for the Food Industry by Harrel and Thelen; Bread Score Report, pp. 502–503 by the American Institute of Baking, 400 E. Ontario St., Chicago, Ill., Burgess Publishing Co., Minneapolis, Minn., published 1959.)

The invention may be carried out in different types of bread formulation and baking conditions. The following is illustrative, however, for typical white bread production in the United States.

Formulation.—This formula for producing a first-quality loaf of white bread is typical of the formulation used in the commercial baking companies using the sponge and dough process.

SPONGE

|  | Grams or lbs. |
|---|---|
| Flour | 552 |
| Water | 314 |
| Yeast | 23 |
| Yeast food | 4 |
| Mono-calcium phosphate | 2 |

DOUGH

|  | |
|---|---|
| Flour | 298 |
| Water, absorption variable. | |
| Sugar | 68 |
| NFDM or substitute | 25.5 |
| Shortening | 25.5 |
| Salt | 18 |
| Monoglycerides | 4 |

A typical second-quality formula is as follows:

SPONGE

|  | Grams or lbs. |
|---|---|
| Flour | 552 |
| Water | 314 |
| Yeast | 19 |
| Yeast food | 4 |
| Mono-calcium phosphate | 2 |

DOUGH

|  | |
|---|---|
| Flour | 298 |
| Water, absorption variable. | |
| Sugar | 42.5 |
| NFDM or substitute | 17 |
| Shortening | 13 |
| Monoglycerides | 4 |

The foregoing represent typical formulations using the normal bread ingredients; flour, water, sugar, shortening and yeast. Certain breads and cakes may use chemical leavening agents in place of the yeast.

A comparison of the formulations of a first-quality and second-quality loaf is as follows:

|  | 1st quality | 2nd quality |
|---|---|---|
| Sugar | 8% or 68 grams or lbs. | 5% or 42.5 grams or lbs. |
| NFDM or substitute | 3% or 25.5 grams or lbs. | 2% or 17.0 grams or lbs. |
| Shortening | do | Do. |
| Yeast | 2.7 or 23.0 grams or lbs. | 2.23% or 19.0 grams or lbs. |

NOTE.—Above percentages and weights are based on the weight of the flour.

Proof time.—The proof time is the amount of time the moulded dough requires to expand to the desired size prior to baking. This is perhaps the most critical time in the production of bread, since proof time governs the speed of all baking equipment. If a dough requires an excessive amount of time to proof, the make-up equipment must be slowed down or even shut down completely. Therefore, in my studies accurate proof times were recorded to determine if the soy protein products would increase or decrease proofing time.

Bake.—The dough was scaled at 19 ounces to produce a loaf of bread with a finished baked weight of 16 ounces. The bake time was set at 18 minutes and the oven temperature was set at 425° F.

Bread cooling.—In commercial baking, the bread is cooled either on racks or in overhead cooling conveyors for a minimum of 60 to 80 minutes before the bread is sliced and wrapped. In the laboratory the bread was cooled for 60 minutes before it was checked for volume by the rapeseed displacement method.

Loaf size.—The one-pound loaf of bread produced by the commercial baker should be in the range of 4½ to 4¾ inches in height. When loaves of bread are too large, the bakery has difficulty in slicing, and many loaves of bread are crippled. If the oversized loaf can be successfully sliced, the problem then is to wrap the sliced bread. Currently, the wrap used in the bakery is either waxed paper or polypropylene film (both expensive). The oversized loaf cannot be wrapped in the standard cut of the wrapping material, therefore, more of the wrapping material is needed per loaf. For this reason, I endeavored to produce all the bread to conform with the size required by the bakery; 4½ to 4¾ inches in height. Loaves of bread that were larger than this size and whose rapeseed displacement was greater than the standard, were substantially downgraded. The standard used in the laboratory was determined by the actual measurement and rapeseed displacement of one-pound loaves of bread produced by commercial bakers in the Chicago area.

The specially-prepared blends of soy protein products which were compared to non-fat dry milk (NFDM) at the 3% level in the first-quality white breads had the following analytical values when made with the soy protein concentrate of Central Soya Company, Inc. (6% water soluble protein) bearing the trade name Promosoy:

| Ingredients | Percent moisture | Percent protein | Percent fiber |
|---|---|---|---|
| 67% soy protein concentrate+33% soy flour (72% NSI) [1] | 5.81 | 62.7 | 3.12 |
| 50% soy protein concentrate+50% soy flour (72% NSI) [1] | 5.95 | 60.8 | 2.90 |
| 67% soy flour (72% NSI) [1]+33% soy protein concentrate (2-1) | 5.90 | 58.0 | 2.99 |

[1] American Oil Chemists' Society Tentative Method Ba 11–65 "Nitrogen Solubility Index (NSI)".

The doughs produced by the 1–1 blend at the 3% (first-quality bread) and 2% (second-quality bread) additive levels, based on 850 lbs. of flour, had a water absorption of 66.1% and 64.6%, respectively. In comparing the absorption of bread doughs made with the 1–1 blend with that made with NFDM, it was found that 2.9% more absorption was obtained by using the 1–1 blend over that of NFDM in the first-quality bread; the difference was 3.1% in case of the second-quality bread. These doughs machined well with resulting bread scores of 93.25 for the 3% 1–1 blend compared to 93.0 for NFDM and 92.50 for the 2% 1–1 blend as compared to 91.75 for NFDM at equal levels of addition.

At present market prices, the combination of soy based ingredients, such as soy flour and soy protein concentrate, is considerably lower in price than NFDM, thus resulting in an ingredient saving for a bread manufacturer. Furthermore, 2.9% increased absorption based on 850 lbs. of flour in the first quality bread amounts to 24.6 lbs. of extra dough per batch. Since the sealing weight for a 1-lb. loaf of bread is 19 ozs. to obtain a finished loaf of 16 ozs., 24.6 lbs. of extra dough will yield 20.7 extra loaves per batch. Thus ingredient cost saving and extra yield are obtained when using the soy based combination claimed in this invention instead of using the conventional additive NFDM.

In the foregoing testing, the nitrogen soluble index of the soy flour component was 72%. In comparing breads made from this flour as one ingredient of the two-element substitute for non-fat dry milk as against a flour having, for example, 64% nitrogen soluble index, it was noted that the higher nitrogen soluble index yielded better overall characteristics, a brighter crumb, no grayness, a silkier grain, smoother texture and finer cell structure. The total bread score determined according to the evaluation described above decreases when the nitrogen soluble index of the flour is lowered to 66%. However, there is no clean breakoff point insofar as the aggregate of the characteristics is concerned. Optimum results are obtained when the nitrogen soluble index of the flour component is set at about 68%.

The following table shows the superior performance of the soy flour-soy protein concentrate combinations in regard to contributing absorption increase in a commercial white bread formualtion, thus demonstrating synergism between soy flour and soy protein concentrate that cannot be explained by protein content alone.

The table above can be readily interpreted by comparing the first and third rows, i.e., I and III. The data in the first row is typical of the prior art using 3% NFDM as the water absorption-promoting additive. Comparing columns 1 and 2 of the first row reveals that the use of 3% NFDM increases the water-absorbability 2%, i.e., from 61.2% to 63.2%. Column 3 shows this difference, i.e., 2%. Column 4 indicates that the additive, i.e., the 3% NFDM, contained 1% protein—based on the fact that NFDM is 34% protein. The last column is the ratio of column 4 to column 3—a measure of the effectiveness of the protein present in the additive—gauged in terms of how that protein promotes increases absorbability. The prior art standard can be seen to be 0.5—each ½% of protein the additive makes possible the absorbability of 1% water.

Row III, characteristic of the invention, reveals that the 1:1 formulation of soy protein concentrate and soy flour needs to be used only in an amount of 0.36% to bring about absorption of 1% water. In all of the data above, the protein increment contributed by the added ingredient was determined from the percentage figures given immediately below the table.

The synergism is particularly evident from a comparison of rows II and III—row II being straight soy flour of the same character used in combination with the soy protein concentrate in row III. The straight soy flour additive yielded an absorption slightly poorer than the NFDM, indicating that flour as a substitute would not be effective to improve absorbability.

While in the foregoing specification a detailed disclosure of the invention has been set down for the purpose of illustration, many variations in the details herein given may be made by those skilled in the art without departing from the spirit and scope of the invention.

I claim:

1. In the preparation of a bakery formulation, the incorporation into the normal bakery ingredients of a minor proportion of a mixture of 1 part of soy protein concentrate to ½ to 2 parts of soy flour, said soy flour having a Nitrogen Solubility Index of not less than about 66% in an amount sufficient to improve the water absorption of the dough while maintaining the other physical and chemical characteristics of the dough and product at least of equal character.

2. The method of claim 1 in which the said minor proportion is of the order of about 2–3%.

3. In a bakery formulation where flour, water, sugar, shortening and yeast or leavening are normally augmented by about 1.5% to about 3% of non-fat dry milk, the improvement comprising the substitution for at least a part of the non-fat dry milk of an equivalent weight of a mixture consisting essentially of 1 part soy protein concentrate to ½ to 2 parts of soy flour, said soy flour having a Nitrogen Solubility Index of not less than about 66%.

| Ingredients | Percent abs. base flour | Percent abs. base flour and additive [1] | Percent abs. contributed by added ingredient [1] | Percent prot. increment contributed by added ingredient [1] | Am't prot. from ingredient that contributes 1% absorption, lb./100 lb. flour |
| --- | --- | --- | --- | --- | --- |
| (I) Base flour+3% NFDM | 61.2 | 63.2 | 2 | 1 | 0.50 |
| (II) Base flour +3% soy flour (72% NSI) | 61.2 | 64.7 | 3.5 | 1.6 | 0.53 |
| (III) Base flour +3% soy flour (72% NSI)-soy prot. concentrate [2] (6% NSI) (1–1) | 61.2 | 66.1 | 4.9 | 1.8 | 0.36 |
| (IV) Base flour +3% soy flour (72% NSI)-soy prot. concentrate [2] (6% NSI) (2–1) | 61.2 | 65.6 | 4.4 | 1.7 | 0.40 |
| (V) Base flour +3% soy flour (72% NSI)-soy prot. concentrate [3] (65% NSI) (1–1) | 59.1 | 63.1 | 4 | 1.7 | 0.42 |
| (VI) Base flour +3% soy flour (72% NSI)-soy prot. concentrate [4] (2% NSI) (1–1) | 59.1 | 63.1 | 4 | 1.7 | 0.42 |
| (VII) Base flour +2% NFDM | 60.0 | 61.5 | 1.5 | 0.7 | 0.47 |
| (VIII) Base flour +2% soy flour (72% NSI) | 60.0 | 63.5 | 3.5 | 1.1 | 0.32 |
| (IX) Base flour +2% soy flour (72% NSI)-soy prot. concentrate [2] (6% NSI) (1–1) | 60.0 | 64.6 | 4.6 | 1.2 | 0.26 |

[1] NFDM protein content 34%, soy flour protein content, 52%, soy protein concentrate prot. content 67–68%.
[2] Aqueous alcohol leaching.
[3] Acid leaching.
[4] Heat denatured—water leaching.

NSI=As determined by American Oil Chemists' Society Tentative Method Ba 11–65 "Nitrogen Solubility Index."

NOTE.—The above bread variables using 3% of additive had the formulation of the first quality bread indicated previously in the text. The breads containing 2% additive levels were made with the formulation given for the second quality bread.

References Cited

Ziembra, J. V.: "Let Soy Proteins Work Wonders For You," Food Engineering, vol. 38, No. 5 (May 1, 1966), pp. 82–84, 87.

LIONEL M. SHAPIRO, Primary Examiner

J. R. HOFFMAN, Assistant Examiner